United States Patent
Ito (10) Patent No.: US 11,663,810 B2
(45) Date of Patent: May 30, 2023

(54) IDENTIFICATION DEVICE, COMPUTER READABLE MEDIUM STORING IDENTIFICATION PROGRAM AND IDENTIFICATION METHOD

(71) Applicant: FUJIFILM Business Innovation Corp., Tokyo (JP)

(72) Inventor: Kensuke Ito, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 143 days.

(21) Appl. No.: 17/368,967

(22) Filed: Jul. 7, 2021

(65) Prior Publication Data
US 2022/0253640 A1 Aug. 11, 2022

(30) Foreign Application Priority Data
Feb. 10, 2021 (JP) .............................. JP2021-020043

(51) Int. Cl.
*G06K 9/00* (2022.01)
*G06V 10/75* (2022.01)
*B29C 45/76* (2006.01)
*G06T 1/00* (2006.01)
*G06F 18/22* (2023.01)

(52) U.S. Cl.
CPC ............ *G06V 10/751* (2022.01); *B29C 45/76* (2013.01); *G06F 18/22* (2023.01); *G06T 1/0007* (2013.01); *B29C 2945/7616* (2013.01)

(58) Field of Classification Search
None
See application file for complete search history.

(56) References Cited

U.S. PATENT DOCUMENTS

| 10,235,593 B2 * | 3/2019 | Ishiyama ............... G06V 20/80 |
| 2016/0042245 A1 | 2/2016 | Ishiyama |

(Continued)

FOREIGN PATENT DOCUMENTS

| JP | 6308370 B2 | 4/2018 |
| JP | 6455678 B2 | 1/2019 |

OTHER PUBLICATIONS

Feb. 4, 2022 Extended European Search Report issued in Patent Application No. 21189820.0.

(Continued)

*Primary Examiner* — Soo Jin Park
(74) *Attorney, Agent, or Firm* — Oliff PLC (57) ABSTRACT

An identification device configured to acquire a collation fixed image of a part of a region where a fixed pattern is formed, and a collation amorphous image of a part of a region where an amorphous pattern formed when the fixed pattern is formed on a region different from the region where the fixed pattern is formed, of a collation molded article; refer to a storage unit that stores, as a registered image in advance for a mold, a fixed image and an amorphous image pair of a part of a region where a fixed and an amorphous pattern are formed, of each of plural molded articles formed using the mold; specify a mold that forms the collation molded article using the registered fixed and collation fixed images, and identify whether the collation amorphous image matches the registered amorphous image of any of the registered images corresponding to the mold.

14 Claims, 9 Drawing Sheets

(56) References Cited

U.S. PATENT DOCUMENTS

2016/0048730 A1    2/2016  Ishiyama
2016/0055398 A1    2/2016  Ishiyama et al.

OTHER PUBLICATIONS

Jan. 17, 2023 Letter of the Applicant of European Patent Application No. 21 189 820.0.
Mar. 15, 2023 Office Action issued in European Patent Application No. 21 189 820.0.

* cited by examiner

IDENTIFICATION DEVICE, COMPUTER READABLE MEDIUM STORING IDENTIFICATION PROGRAM AND IDENTIFICATION METHOD

CROSS-REFERENCE TO RELATED APPLICATIONS

This application is based on and claims priority under 35 USC 119 from Japanese Patent Application No. 2021-020043 filed on Feb. 10, 2021.

BACKGROUND

1. Technical Field

The present invention relates to an identification device, a computer readable medium storing an identification program and an identification method.

2. Related Art

Japanese Patent No. 6455678 discloses a collation device including: an acquisition unit configured to set at least a part of a skeleton portion of an identification mark attached to a component or a product as a collation region, and acquire a first image of a satin-finish pattern formed in the collation region and a second image of a satin-finish pattern formed in a collation region of a skeleton portion of an identification mark attached to the component to be identified or the product or a skeleton portion of a component that is one of the constituent elements of the product to be identified; and an output unit configured to compare the first image and the second image and output a result of the collation, in which the satin-finish pattern is formed by a mold, is formed by blast processing or satin-finish processing by powder coating, or plating as a subsequent processing, and the roughness of the pattern formed by the mold is made rougher than the pattern generated by the subsequent processing.

Japanese Patent No. 6308370 discloses a collation device including: an extraction unit configured to extract an image of an n dimensional symbol and an image of a satin-finish pattern from a captured image including at least an n dimensional symbol indicating information related to a component, a product, or a product that uses the prior product as a constituent element, and a satin-finish pattern formed in a collation region which is at least a part of a predetermined region of a component or a product to which a satin-finish pattern is applied by a mold; an acquisition unit configured to acquire information related to a component or a product from the extracted image of the n dimensional symbol; and a unit configured to acquire and output a collation result in which an image of the extracted satin-finish pattern is collated with a database stored as a representative value of an image feature of a satin-finish pattern formed in a collation region of at least one component or product of plural components or products in which a satin-finish pattern is applied by a mold, in which the satin-finish pattern is formed based on a satin-finish pattern formed by a mold, and is subjected to a blast processing or satin-finish processing by powder coating, or plating as a subsequent processing, and the roughness of the satin-finish pattern formed by the mold is made rougher than the pattern of the individual difference generated by the subsequent processing, whereby the mold specification and identification of the individual difference can be easily performed independently.

SUMMARY

In the molded article, it may be desired to specify a mold that forms the molded article after manufacturing, and the specifying is referred to as mold specification. In addition, it may be desired to identify which one of the data of each molded articles left as the history as well as the molded mold corresponds to, and the identifying is referred to as an individual identification. For example, in order to track a manufacturing history after a molded article is manufactured and put on the market, a method of performing individual identification after performing mold specification is used.

As a method of performing individual identification after mold specification, there is also a method in which, as in the identification device according to Japanese Patent No. 6455678 or Japanese Patent No. 6308370, mold specification is performed by a pattern of a molded article, and individual identification is performed by satin-finish processing or the like performed on a specific collation region after forming. However, from the viewpoint of avoiding complication of the manufacturing process and the uniformity of the appearance of the molded article, it is necessary to consider a method that does not perform additional process after forming with respect to the molded article.

Aspects of non-limiting embodiments of the present disclosure relate to providing an identification device, a computer readable medium storing an identification program and an identification method capable of performing mold specification and individual identification of a molded article without performing additional process on a surface of the molded article for individual identification in a manufacturing stage.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an identification device that includes a processor, in which the processor is configured to acquire a collation fixed image that is an image of at least a part of a region, where a fixed pattern is formed, of a collation molded article that is a collation target, and a collation amorphous image that is an image of at least a part of a region, where an amorphous pattern that is a pattern formed when the fixed pattern is formed and formed on a region different from the region where the fixed pattern is formed, of the collation molded article; refer to a storage unit that stores, as a registered image in advance for each of at least one mold, a pair of a registered fixed image, that is an image of at least a part of a region where a fixed pattern is formed, and a registered amorphous image, that is an image of at least a part of a region where an amorphous pattern is formed, of each of plural molded articles formed by using the at least one mold; and specify a mold that forms the collation molded article using the registered fixed image and the collation fixed image, and identify whether the collation amorphous image matches the registered amorphous image of any of the registered images corresponding to the specified mold.

BRIEF DESCRIPTION OF THE DRAWINGS

Exemplary embodiments of the present invention will be described in detail based on the following figures, wherein.

DETAILED DESCRIPTION

Hereinafter, embodiments of the present invention will be described in detail with reference to the drawings. In the following description, an identification device and an identification program according to the present invention that are applied to an identification device and an identification program for mold specification and individual identification after manufacture of a molded article formed by a mold will be described as an example. Here, the "mold" in the present exemplary embodiment means a mold that forms a fixed pattern on a large part of the surface of a molded article, and examples thereof include a die casting method, an injection forming method, and a mold forging method. The product formed using the mold is referred to as a "molded article". In the following description, the surface opposite to the back surface is referred to as a "front surface", and the outer appearance surface regardless of the front surface or the back surface is referred to as a "surface".

First Exemplary Embodiment

Figure 1:
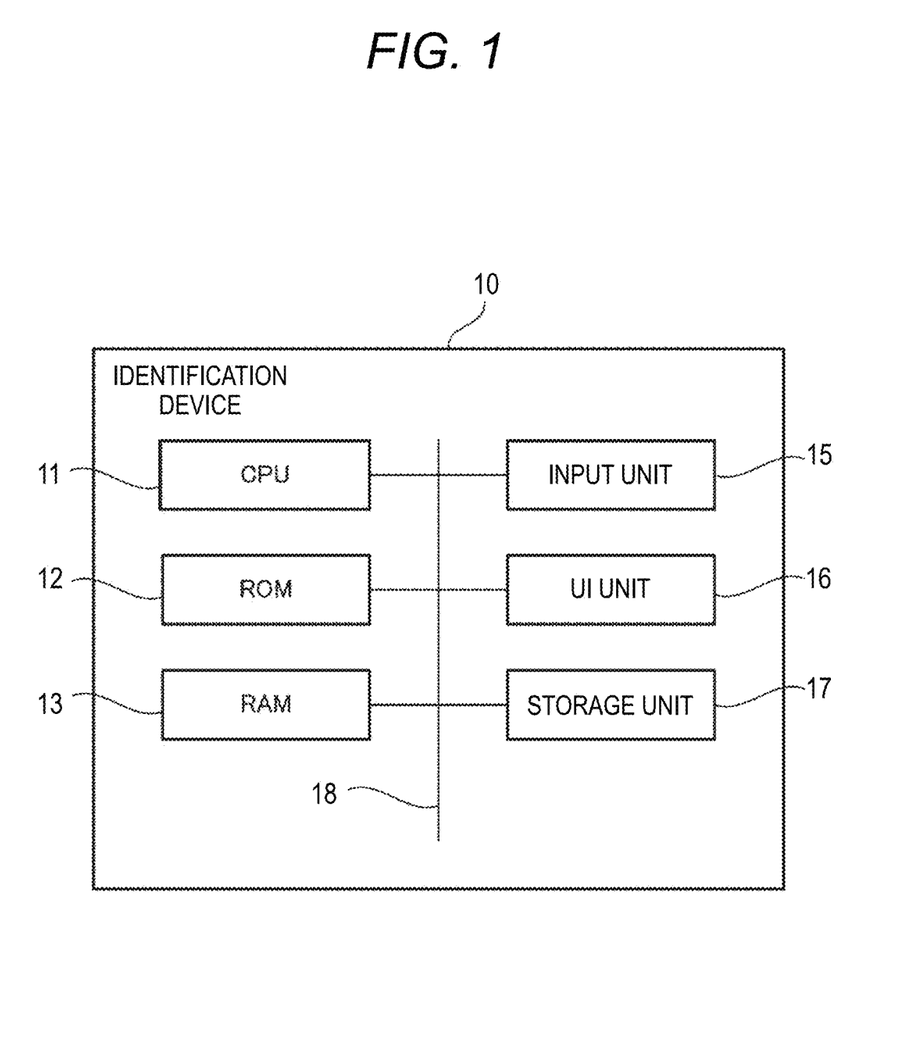
FIG. 1 is a block diagram illustrating an example of a configuration of an identification device according to a first exemplary embodiment.

An identification device and an identification program according to the present exemplary embodiment will be described with reference to FIGS. 1 to 7. As illustrated in FIG. 1, the identification device 10 according to the present exemplary embodiment includes a central processing unit (CPU) 11, a read only memory (ROM) 12, a random access memory (RAM) 13, an input unit 15, a user interface (UI) unit 16, and a storage unit 17. The CPU 11 is an example of a "processor" according to the present invention.

The CPU 11 performs overall control of the identification device 10, and executes an identification process for performing mold specification and individual identification according to the present exemplary embodiment. The ROM 12 stores various programs including a control program of the identification device 10, an identification processing program executed by the identification device 10, data, or the like. The RAM 13 is a memory used as a work area when various programs are executed. The CPU 11 executes the identification process by expanding a program stored in the ROM 12 into the RAM 13 and executing the program.

The input unit 15 (reception unit) inputs (receives) an image to be used when performing the identification process on a molded article to be collated. In the present exemplary embodiment, in the manufacturing stage, an image of a specific region on the surface of the molded article is captured by a predetermined method for each molded article, and is stored in the storage unit 17 as a registered image. In addition, for example, a collation image obtained by capturing an image of the surface of a specific region of the collation molded article by a predetermined method similar to that at the time of manufacturing is used in order to perform mold specification and individual identification by using a molded article returned from the market as a collation molded article for tracking of a manufacturing history (a manufacturing date, a manufacturing lot, a use appliance, or the like). The input unit 15 is a portion that receives the registered image and the collation image. The input unit 15 may be an interface such as a communication interface, a Universal Serial Bus (USB) for inputting the registered image or the collation image as data, or an imaging device such as a camera.

The UI unit 16 is a portion where the user gives instructions such as execution of the identification process, input of a registered image and the collation image, or the like. The UI unit 16 is, for example, a liquid crystal monitor having a touch panel function.

The storage unit 17 mainly stores the registered image. The storage unit 17 is, for example, a hard disk drive (HDD), a solid-state drive (SSD), or a flash memory. The storage unit 17 may store an identification processing program or the like.

As illustrated in FIG. 1, the CPU 11, the ROM 12, the RAM 13, the input unit 15, the UI unit 16, and the storage unit 17 are connected to each other via a bus 18.

Here, in general, there is a case where it is necessary to track a manufacturing history after the product is manufactured. Even in a molded article manufactured using a mold, it may be required to track a manufacturing history of a molded article that has been operated, and in this case, it is necessary to first specify the molded mold. A mold unique ground pattern (a fixed pattern, for example, a satin-finish pattern) may be formed on a large number of portions of the surface of the molded article, and the mold may be specified by using the fixed pattern. However, in order to track a manufacturing history, it is necessary to specify (individual identification) a molded article as an individual formed by the mold. However, as will be described later, the fixed pattern is not so different that individual identification can be performed stably.

On the other hand, in the mold forming step, when a trace of an auxiliary tool such as an ejector pin is formed on a molded article, or when an auxiliary tool is not used, an incomplete portion of a fixed pattern may be formed. The ejector pin is a pin used when the molded article is removed from mold. These traces are uncontrollable (for example, there is a possibility that an end surface of an ejector pin having a unique pattern rotates and gives a trace different for each forming) in the mold forming step. That is, when the auxiliary tool is used, there is a high possibility that an amorphous pattern is formed on the surface of the molded article. The present exemplary embodiment is based on the finding that when the amorphous pattern is used, the mold specification and the individual identification of the molded article are performed without performing an additional process on the surface of the molded article for individual identification in the manufacturing stage.

Therefore, in the present invention, in the manufacturing stage, a pair (registered image) of the image (fixed image) of the region of the fixed pattern and the image (amorphous image) of the region of the amorphous pattern of the molded article is stored in the storage unit in advance; and when performing individual identification after the manufacturing, the mold that forms the collation molded article is specified by comparing the collation fixed image of the collation molded article and the registered fixed image with each other, and then the collation amorphous image and the registered amorphous image accompanying the specified mold are compared with each other to uniquely identify the registered image corresponding to the collation molded article. As a result, the mold specification and the individual identification of the molded article are performed without performing an additional process on the surface of the molded article for individual identification in the manufacturing stage. Further, after one of the plural molds is specified, it is not necessary to compare all the images related to all the molds with the captured image of the collation molded article by comparing the registered image accompanying the specified mold with the collation image. As a result, even when it is necessary to increase the resolution of an image of the amorphous pattern in order to perform individual identification more accurately, the calculation load is reduced (specifically, the number of 1/molds).

Here, the "fixed pattern" and the "amorphous pattern" according to the present exemplary embodiment will be described in more detail. The "fixed pattern" according to the present exemplary embodiment refers to a pattern that is formed on a molded article by a mold and cannot be intentionally reproduced by a human in a manufacturing process. The fixed pattern is a ground pattern occupying most of the surface of the molded article for a design reason. For example, the pattern of the surface of the mold itself is transferred to the molded article by forming the molded article using the mold, so that the pattern of the surface of the mold itself is formed on the molded article. Specifically, of the satin-finish pattern on the surface of the molded article formed by the mold, the portion to which the pattern on the surface of the mold itself is transferred corresponds to the fixed pattern. A pattern such as a QR code (registered trademark) that can be intentionally reproduced is not included in the fixed pattern.

On the other hand, the "amorphous pattern" according to the present exemplary embodiment is a pattern formed when a fixed pattern is formed, and is a pattern transferred to a molded article in a state where the pattern of the surface of the mold itself is incomplete in some circumstances. The term "pattern" refers to a pattern that is formed in a region different from the region in which the fixed pattern is formed and cannot be intentionally reproduced by a human. For example, in forming using a mold, examples of the auxiliary tool that is a trace remaining on the surface of a molded article of a tool that is auxiliarily used for reasons on the mechanism include an ejector pin, a gate, a runner, or the like. A pattern such as a QR code (registered trademark) that can be intentionally reproduced is not included in the amorphous pattern.

Figure 2A:
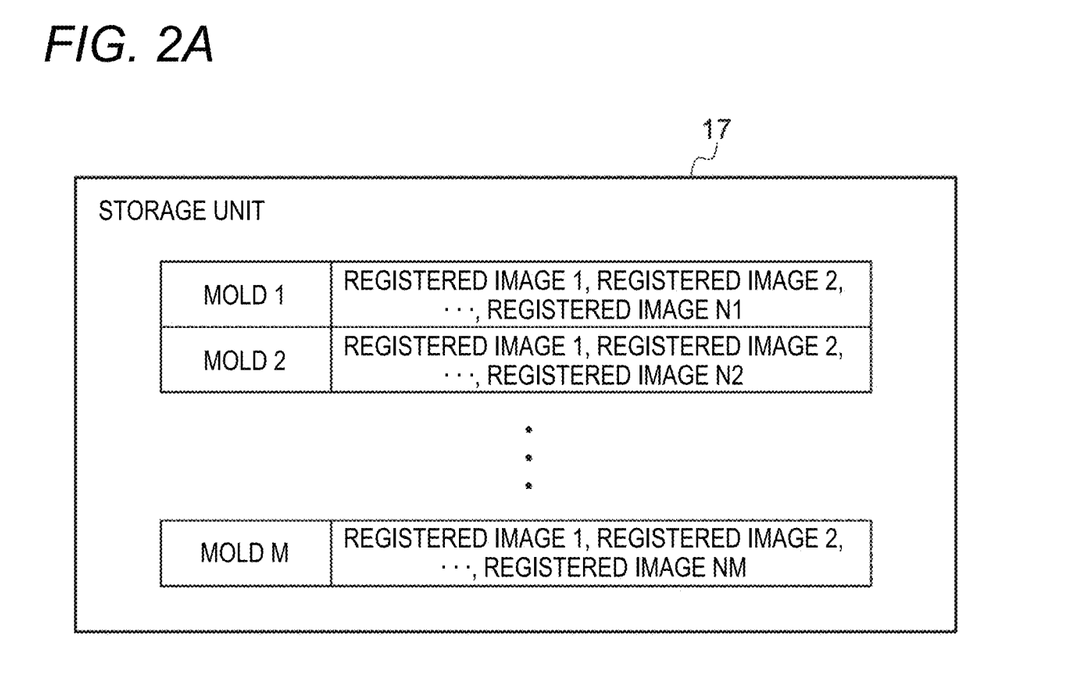
FIG. 2A is a block diagram illustrating a method of storing a registered image in a storage unit of the identification device according to the first embodiment.

Next, the registered image according to the present exemplary embodiment and the method of storing the registered image in the storage unit 17 will be described with reference to FIGS. 2A and 2B.

Figure 2B:
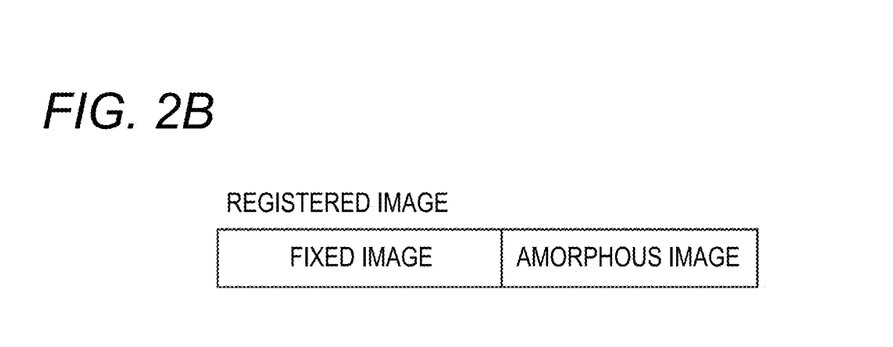
FIG. 2B is a block diagram illustrating a configuration of the registered image.

As illustrated in FIG. 2B, the registered image includes a pair of a fixed image (registered fixed image) and an amorphous image (registered amorphous image). As described above, in the present exemplary embodiment, the fixed image refers to an image of a region of a fixed pattern of a molded article, and the amorphous image refers to an image of a region of an amorphous pattern of a molded article.

In the storage unit 17, registered images of plural molded articles formed by using one or plural molds (examples of "mold" in FIG. 2A) of a molded article are stored. In FIG. 2A, for M molds (mold 1, mold 2, . . . , mold M) of a molded article, N1 registration images (registered image 1, registered image 2, . . . , registered image N1) are stored for the mold 1, N2 registration images (registered image 1, registered image 2, . . . , registered image N2) are stored for the mold 2, and NM registration images (registered image 1, registered image 2, . . . , registered image NM) are stored for the mold M. In each of the registered images, various information (for example, a manufacturing history or the like) of a molded article corresponding to the registered image may be linked.

Figure 3A:
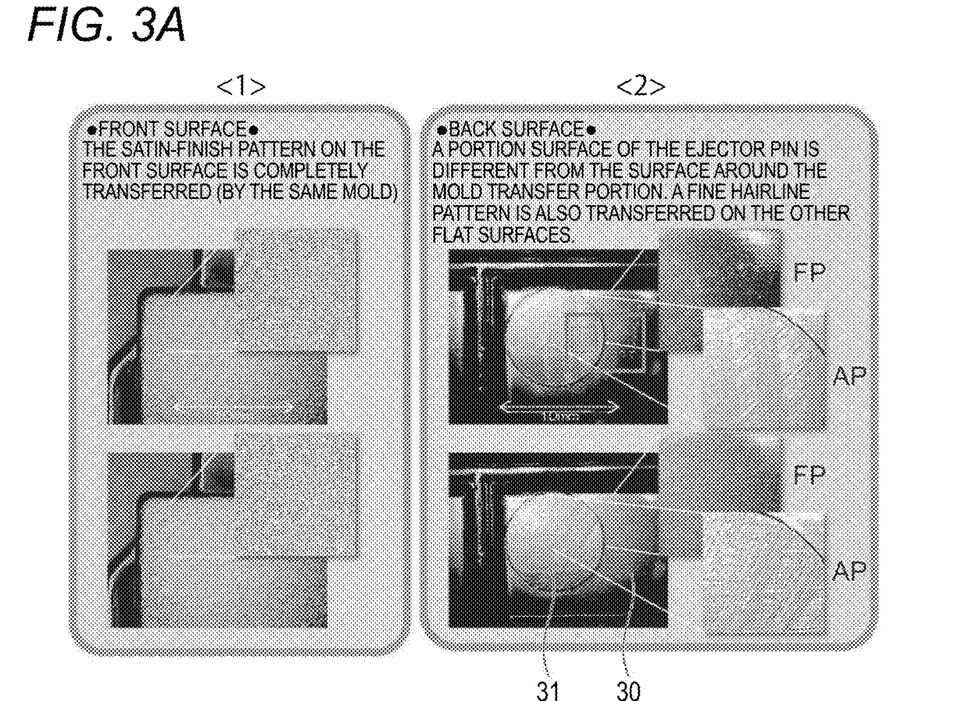
FIG. 3A is a diagram for explaining an example of a fixed pattern and an amorphous pattern.
Figure 3B:
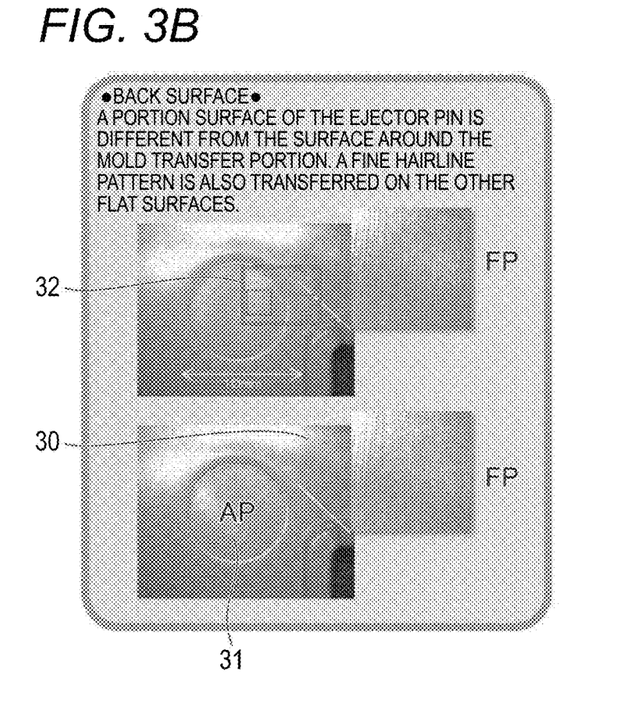
FIG. 3B is a diagram for explaining an imaging region.

A specific example of the registered image will be described with reference to FIGS. 3A and 3B. FIGS. 3A and 3B illustrate an example of a molded article of a synthetic resin formed by injection forming using a mold. <1> of FIG. 3A illustrates the pattern of the front surface of the sample of the molded article, and <2> of FIG. 3A illustrates the pattern of the back surface.

<1> of FIG. 3A is an example of an image acquired by imaging (hereinafter, may be referred to as "shot") a satin-finish pattern on the front surface of one molded article twice. As illustrated in the example, the satin pattern on the front surface is transferred with good reproducibility to such an extent that the satin-finish pattern can be discerned by the naked eye even when the shot is changed.

<2> of FIG. 3A illustrates images of the back surfaces of two molded articles formed by one mold. As illustrated in <2> of FIG. 3A, a trace of a circular ejector pin remains on the back surface. Hereinafter, such a trace region will be referred to as an "amorphous region 31". On the other hand, a region around the amorphous region 31 is referred to as a "fixed region 30". The fixed region 30 is a transfer region of the surface of the mold. The pattern formed in the amorphous region 31 is referred to as "amorphous pattern AP", and the pattern formed in the fixed region 30 is referred to as "fixed pattern FP". The amorphous patterns AP of the ejector pins formed on the back surfaces of the two molded articles illustrated in <2> of FIG. 3A are obviously different. On the other hand, it can be seen that the two fixed patterns FP are transferred to the hairline pattern and are similar to each other.

FIG. 3B illustrates two shots on the back surface of a molded article different from that in FIG. 3A. Also in the example, it can be seen that the amorphous region 31 that is a trace of the circular ejector pin is a pattern (an amorphous pattern AP) different from that of the fixed region 30. In addition, it can be seen that the fixed pattern FP is transferred to a fine portion.

Here, an imaging region 32 according to the present exemplary embodiment will be described. In the present exemplary embodiment, as illustrated in FIG. 3B, the imaging region 32 is set such that at least a part of the fixed region 30 (indicated by a dotted line in FIG. 3B) and at least a part of the amorphous region 31 (indicated by a solid line in FIG. 3B) are contained in one shot. As a result, the fixed pattern FP and the amorphous pattern AP may be contained in one image. The image obtained by imaging the imaging region 32 corresponds to the registered image illustrated in FIG. 2B, the fixed pattern FP in the imaging region 32 corresponds to the fixed image, and the amorphous pattern AP in the imaging region 32 corresponds to the amorphous image.

The resolution when imaging the imaging region 32 is set, for example, to a resolution (for example, about 3000 dpi) of an image that requires finer information among the fixed pattern FP and the amorphous pattern AP. As a result, the mold specification and the individual identification are executed more accurately. In the present exemplary embodiment, a mode in which the fixed pattern FP and the amorphous pattern AP are formed as one image is described as an example, but the present invention is not limited thereto, and the fixed pattern FP and the amorphous pattern AP may be formed as separate images. As a result, the capacity of the image data may be further reduced, and the selection of the region to be imaged of each of the fixed pattern FP and the amorphous pattern AP becomes flexible.

Figure 4:
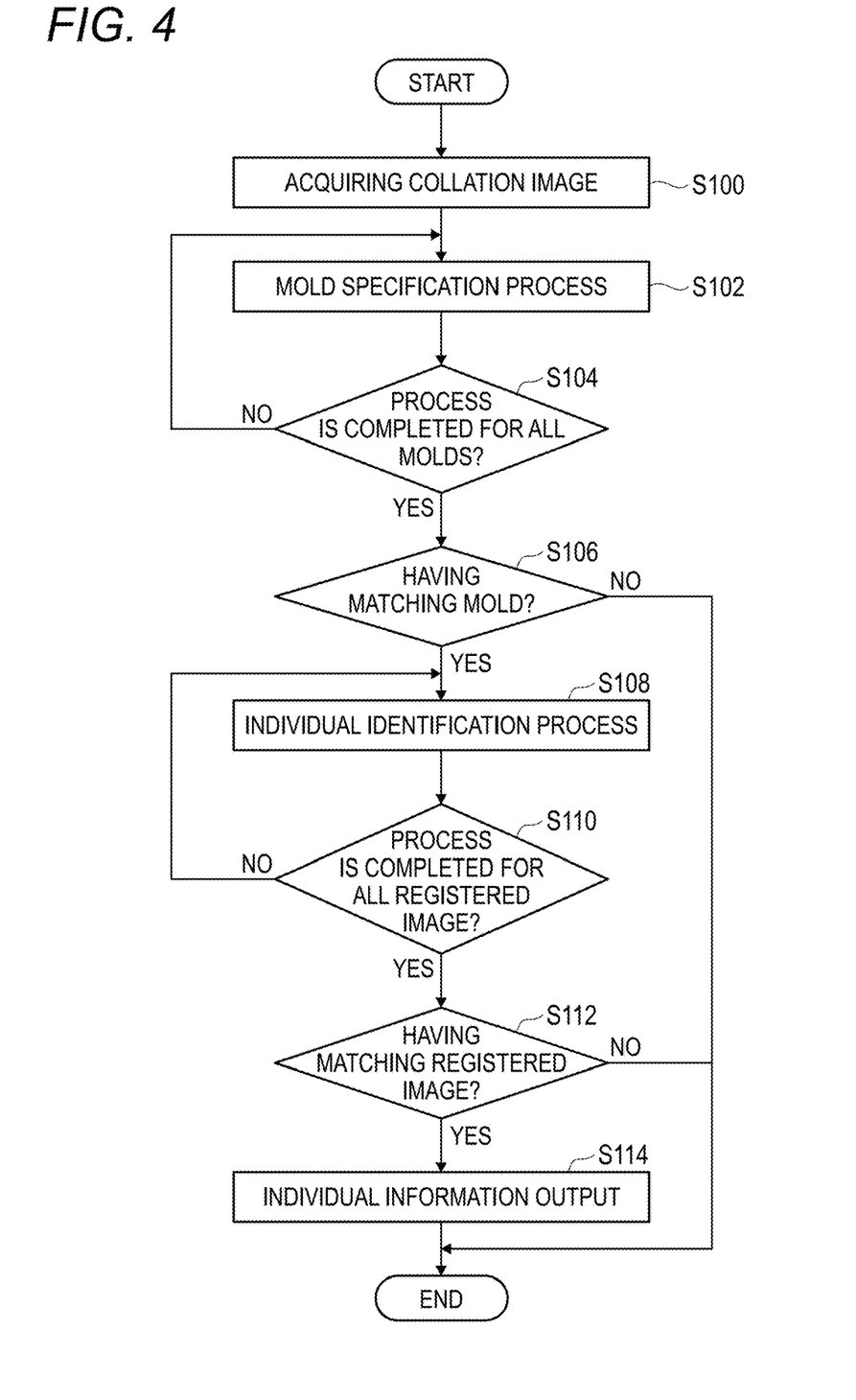
FIG. 4 is a flowchart illustrating a flow of a process of an identification processing program executed by the identification device according to the exemplary embodiment.

Next, an identification process executed by the identification device 10 according to the present exemplary embodiment will be described with reference to FIG. 4. FIG. 4 is a flowchart illustrating a flow of a process of the identification processing program executed by the identification device 10. As illustrated in FIG. 1, for example, the identification processing program is stored in the ROM 12, and the CPU 11 reads out the program from the ROM 12 and expands the program in the RAM 13 or the like and executes the program. In the present exemplary embodiment, an example in which the identification processing is executed by the CPU 11 will be described as an example, but the present invention is not limited thereto, and a device dedicated to the identification processing may be configured by an Application Specific Integrated Circuit (ASIC), dedicated software, or the like, and executed under the management of the CPU 11. In the following description, it is assumed that a registered image related to plural molds has already been stored in the storage unit 17, and a collation molded article that is a target of the identification process is prepared.

As illustrated in FIG. 4, a collation image is acquired in step S100. The "collation image" is an image of a collation molded article of the same imaging region 32 as the registered image, and includes a fixed image (collation fixed image) obtained by imaging the fixed pattern FP similar to the registered image and an amorphous image (collation amorphous image) obtained by imaging the amorphous pattern AP.

In step S102, the mold specification process is executed. The mold specification process is performed by comparing the fixed image (registered fixed image) of the registered image with the fixed image (collation fixed image) of the collation image and making an determination. As the algorithm of the determination, for example, Yoctrace or the like is used. The comparison is performed for all the molds. It should be noted that the registered fixed image to be compared with the collation fixed image in the mold specification process is performed by selecting any one of the registered fixed images belonging to each mold. That is, for example, in the case of the example illustrated in FIG. 2A, for the mold 1, any one of the registered image 1 to the registered image N1 may be compared with the collation fixed image. The same applies to the molds 2 to M. In addition to the registered image of each mold, a registered image dedicated to the mold specification may be stored.

In step S104, it is determined whether or not the mold specification process has been completed for all the molds. When the determination is negative, the process returns to step S102, and the mold specification process is continued. On the other hand, when the determination is positive, the process proceeds to step S106.

In step S106, it is determined whether or not there is a mold including a registered fixed image that matches the collation fixed image of the collation molded article. When the determination is positive, the process proceeds to step S108. On the other hand, when the determination is negative, the identification process program is ended. When it is determined that there is a match mold, a mold that forms the collation molded article is specified.

In step S108, individual identification process is executed. The individual identification process is performed by comparing and determining an amorphous image (registered amorphous image) of the registered image with an amorphous image (collation amorphous image) of the collation image. As the algorithm of the determination, for example, Yoctrace or the like is used. The comparison is performed on all the registered images registered in the specified mold. For example, in a case where the mold 1 is specified in the example illustrated in FIG. 2A, the collation amorphous image is compared with all the registered amorphous images of the registered image N1 from the registered image 1. Here, when there are plural registered images that are equal to or greater than the determination threshold value as a result of the determination, for example, a registered amorphous image having the highest similarity is adopted. The details of the "determination threshold value" and the "similarity" will be described later.

In step S110, it is determined whether or not the comparison with the collation amorphous image has been completed for all the registered amorphous images. When the determination is negative, the process returns to step S108 to continue the individual identification process. On the other hand, the determination is positive, the process proceeds to step S112.

In step S112, it is determined whether or not there is a registered image including a registered amorphous image that matches the collation amorphous image. When the determination is positive, the process proceeds to step S114. On the other hand, when the determination is negative, the identification process program is ended. When there is a registered amorphous image that matches the collation amorphous image in step S112, a registered image obtained by imaging the collation molded article is specified, that is, individual identification is performed. In the present exemplary embodiment, a case in which the identification process is ended when a negative determination is made in step S112 and there is no matching registered amorphous image has been described as an example, but the present invention is not limited thereto, and a registered amorphous image having the highest similarity may be presented as a candidate.

In step S114, information (for example, a manufacturing history or the like) related to the individually identified collation molded article is output, and then the identification processing program is ended.

Figure 5:
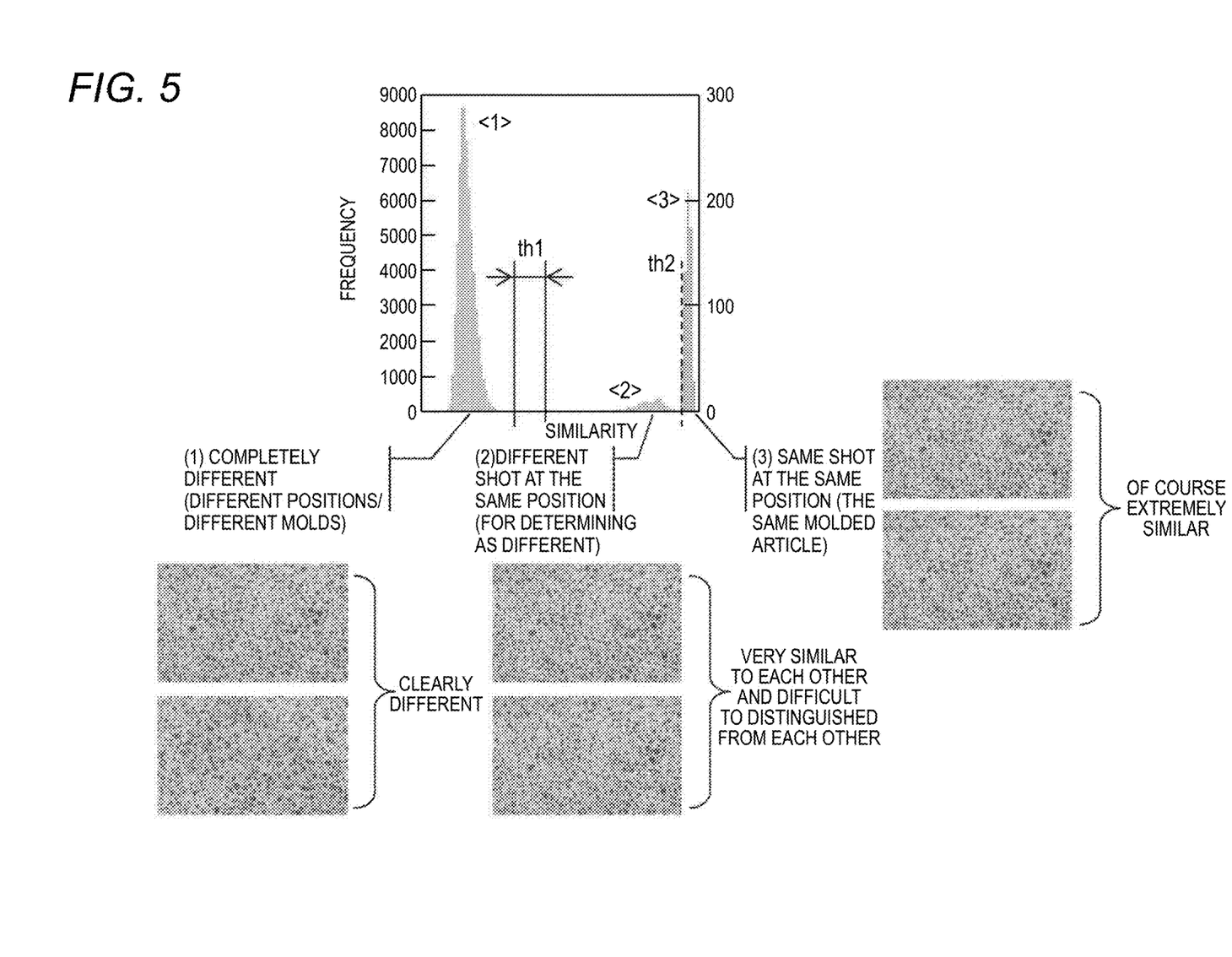
FIG. 5 is a diagram for explaining a principle of a mold specification process in the identification device according to the exemplary embodiment.

Next, the principle of the mold specification process according to the present exemplary embodiment will be described with reference to FIG. 5. FIG. 5 is a diagram for explaining that the mold can be specified by taking a fixed pattern FP (satin pattern) on the front surface of a molded article by aluminum die casting as an example. In FIG. 5, the horizontal axis represents similarity, and the vertical axis represents the frequency (number of shots). The similarity indicates a degree to which the images are similar to each other, and is measured by pattern matching or the like. In FIG. 5, the set indicated by <1> indicates the comparison result between different images, and the set indicated by <3> indicates the comparison result between the same images. "Comparison of different images" is a comparison between different images (images of different regions and images of molded articles by different molds), and "comparison of same images" is a comparison between the same images (images of the same shot in the same region). <2> illustrates a comparison between images of different shots (different molded articles by the same mold) in the same region. The resolution of each image is, for example, about 600 dpi and 48 px to 96 px.

As illustrated in FIG. 5, images included in <1> are clearly different from each other to such an extent that the images can be determined visually, and are distributed in the vicinity of the minimum value of the similarity. The images included in <3> are very similar to each other, and are distributed in the vicinity of the maximum value of the similarity. As is clear from FIG. 5, the set of <1> and the set of <2> are clearly separated from each other, and a determination range th1 having a width that does not cause any problem in practical use is set. That is, it can be seen from the comparison between <1> and <3> that it is possible to perform mold specification. In the present exemplary embodiment, a boundary for distinguishing between the two distributions from each other is defined as a "determination threshold value", a range in which the frequency between the two distributions is 0 is defined as a range in which the determination threshold value is set, and the range is defined as a "determination range th".

On the other hand, since images included in <2> are very similar to each other and are difficult to be distinguished from each other, the set indicated by <2> is distributed in a relatively high range although the similarity is lower than the set indicated by <3>. Therefore, the set indicated by <2> and the set indicated by <3> are very close to each other. For this reason, the determination range th2 for distinguishing between <2> and <3> has a narrow width, and the determination range cannot be set at a level that does not cause any problem in practical use, or the setting cannot be performed in the first place since the skirts overlap each other. That is, it can be seen that, when a satin-finish pattern on the front surface is used, it is possible to perform the mold specification, but it is difficult to perform the individual identification.

Figure 6A:
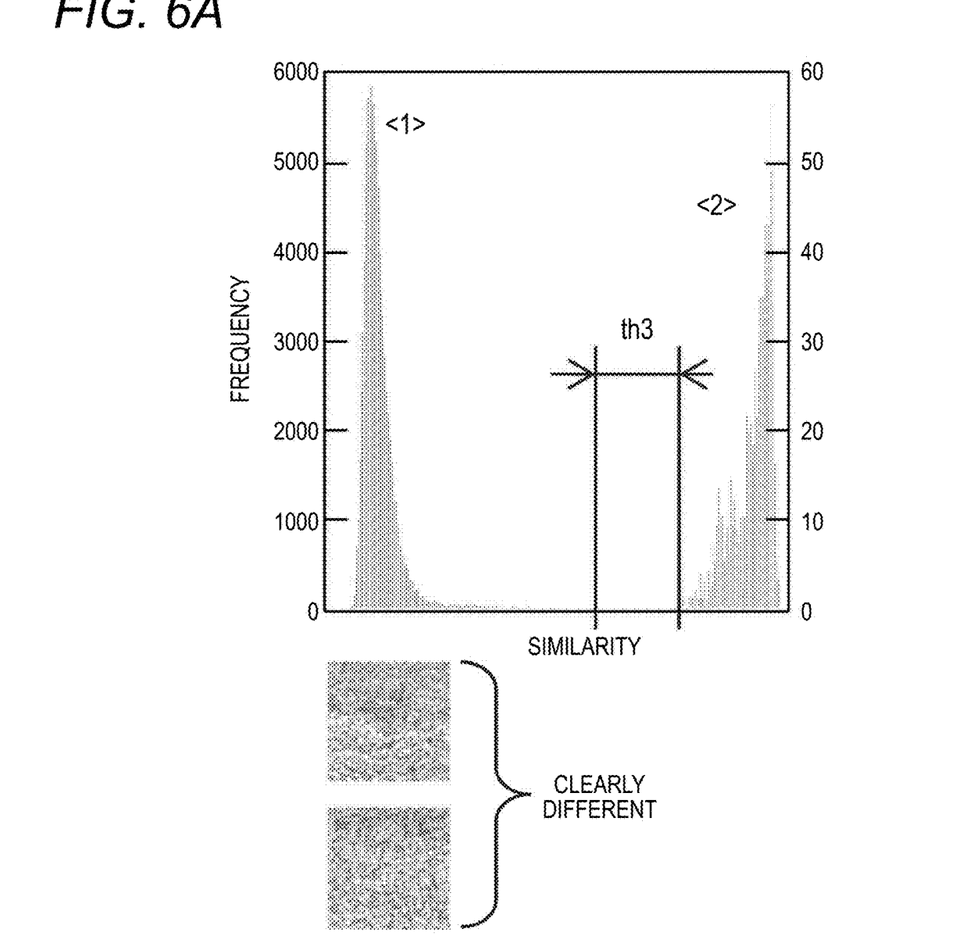
FIG. 6A is a graph illustrating a comparison result for explaining the principle of individual identification processing in the identification device according to the exemplary embodiment.
Figure 6B:
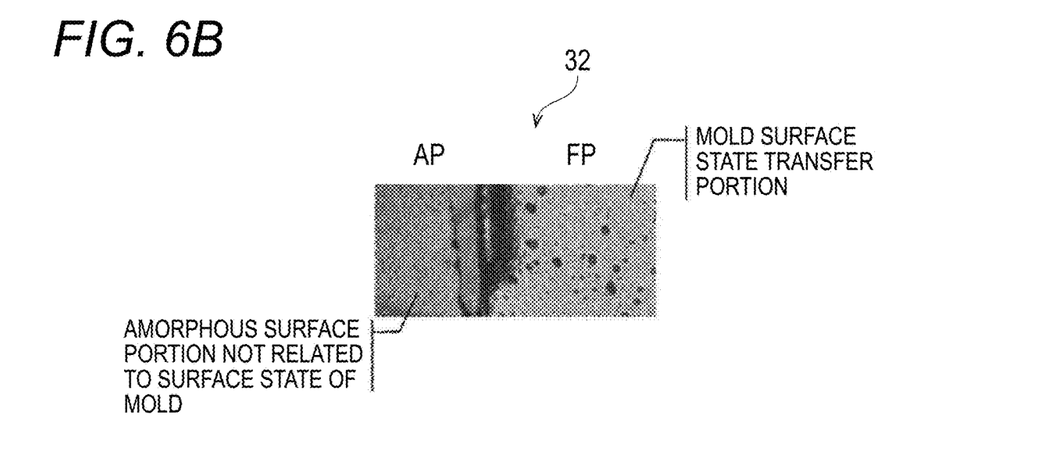
FIG. 6B is a diagram illustrating an imaging region for explaining the principle of individual identification processing in the identification device according to the exemplary embodiment.

Next, the principle of individual identification will be described with reference to FIGS. 6A and 6B. FIG. 6A illustrates a collation result using an image including a pair of a fixed pattern FP and an amorphous pattern AP in the specific imaging region 32 of plural aluminum die-cast molded articles by a certain mold as illustrated in FIG. 6B. In the example illustrated in FIGS. 6A and 6B, since the fixed pattern FP adjacent to the amorphous pattern AP is a relatively clear pattern, the fixed pattern FP is handled as a fixed pattern in the same manner as the satin-finish pattern on the front surface illustrated in FIG. 5. In FIG. 6A, a set indicated by <1> illustrates a result of comparison of the amorphous patterns AP with each other, and a set indicated by <2> indicates a result of comparison of the amorphous pattern AP itself. In the example illustrated in FIGS. 6A and 6B, since the fixed pattern FP and the amorphous pattern AP are adjacent to each other, the image to be collated is one image. However, when the fixed pattern FP and the amorphous pattern AP are separated from each other, the fixed pattern FP and the amorphous pattern AP may be separate images and linked with each other.

As illustrated in <1> of FIG. 6A, the amorphous patterns AP are clearly different from each other, and the similarity is distributed in the vicinity of the minimum value. On the other hand, as illustrated in <2>, the amorphous patterns AP are similar to each other, and the similarity is distributed in the vicinity of the maximum value. Therefore, a determination range th3 that has no practical problem is set between a group for comparison of the amorphous patterns illustrated in <1> and a group for comparison of the amorphous patterns illustrated in <2>. From this, it can be seen that the individual identification is accurately performed by using the amorphous patterns AP. Here, as the pattern of the surface of the molded article used as the amorphous pattern AP, in addition to the aforementioned ejector pins, examples includes a portion where the release agent is poorly applied (a part in which the mold release agent is applied with light and shade), a gate portion, or the like. The amorphous pattern AP illustrated in FIG. 6 is an example in which a gate portion is used.

The image illustrated in FIG. 6B is captured at a resolution of 1000 dpi as an example. By setting the resolution to such a degree, the uneven portion of the amorphous pattern AP is captured in detail. On the other hand, since the fixed pattern FP is captured in detail at a resolution of about 300 dpi, when the fixed pattern FP and the amorphous pattern AP are separate images, the fixed pattern FP and the amorphous pattern AP may have different resolutions such as 300 dpi for the former and 1000 dpi for the latter. As a result, the capacity of the storage unit 17 at the time of storing the image is saved.

Next, the imaging region 32 according to the present exemplary embodiment will be described in more detail with reference to FIGS. 7A, 7B and 7C.

Figure 7A:
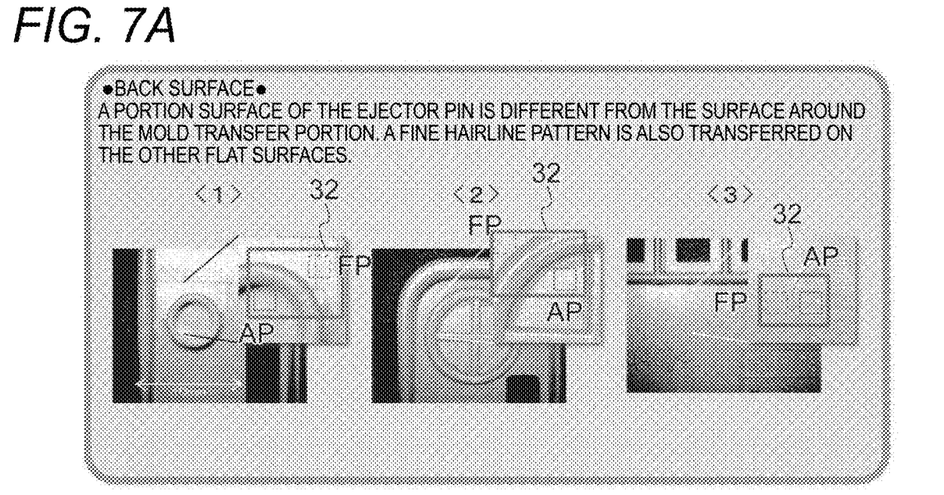
FIG. 7A, FIG. 7B and FIG. 7C are diagrams for explaining an example of a fixed pattern and an amorphous pattern.

The examples <1>, <2>, and <3> illustrated in FIG. 7A illustrate patterns formed by three different molded articles using a substantially circular ejector pin. In each pattern, an ejector pin forms a unique trace, and in a region adjacent to the ejector pin, a fine pattern that is comparable to the pattern on the front surface is formed. Therefore, as illustrated in FIG. 7A, the imaging region 32 including the fixed pattern FP and the amorphous pattern AP is set.

Figure 7B:
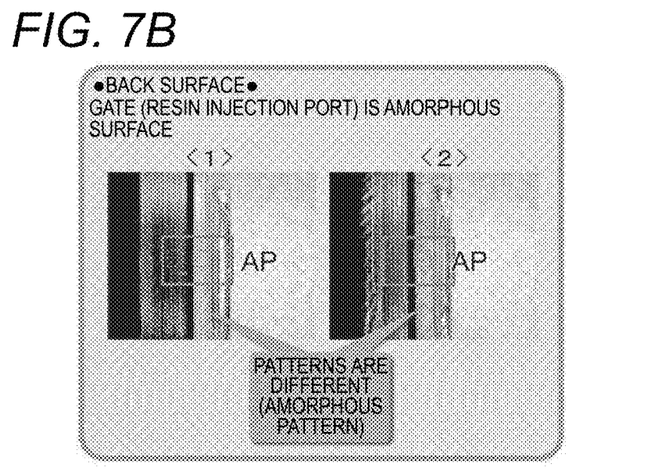

FIG. 7B illustrates an example of the amorphous pattern AP in the case where the gate is used as the amorphous region 31 (denoted as "indeterminate surface" in FIG. 7B). The "gate" is an injection port of a resin that is a material of a molded article. <1> and <2> illustrated in FIG. 7B illustrate the image of the gate portion of another molded article by the same mold. As illustrated in FIG. 7B, even when the same mold is used, the amorphous patterns AP of the gate portion are different enough to be distinguished from each other.

Figure 7C:
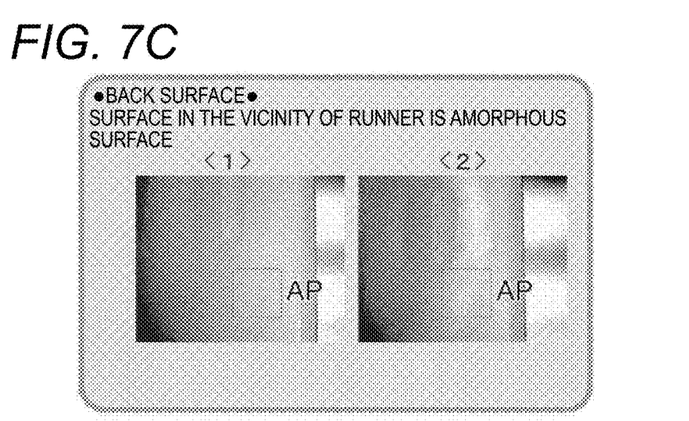

FIG. 7C illustrates an example of the amorphous pattern AP when the vicinity of the runner is used as the amorphous region 31 (denoted as "indeterminate surface" in FIG. 7B).

The "runner" is a passage into which a resin as a material of a molded article flows. <1> and <2> illustrated in FIG. 7C illustrate images of runner portions of another molded article by the same mold. As illustrated in FIG. 7C, even when the same mold is used, the amorphous patterns AP of the runner portion are different enough to be distinguished from each other.

Second Exemplary Embodiment

An identification device and an identification program according to the present exemplary embodiment will be described with reference to FIGS. 8A and 8B. In the above exemplary embodiment, an example has been described in which the trace of the auxiliary tool used for mold forming is used as the amorphous pattern, but in the present exemplary embodiment, a portion in which a surface of a mold (either the front surface or the back surface) is incompletely transferred is used as an amorphous pattern. Therefore, since the identification device itself is the same as that of the above-described exemplary embodiment, a detailed description will be omitted by referring to FIGS. 1, 2, and 4 when necessary.

Figure 8A:
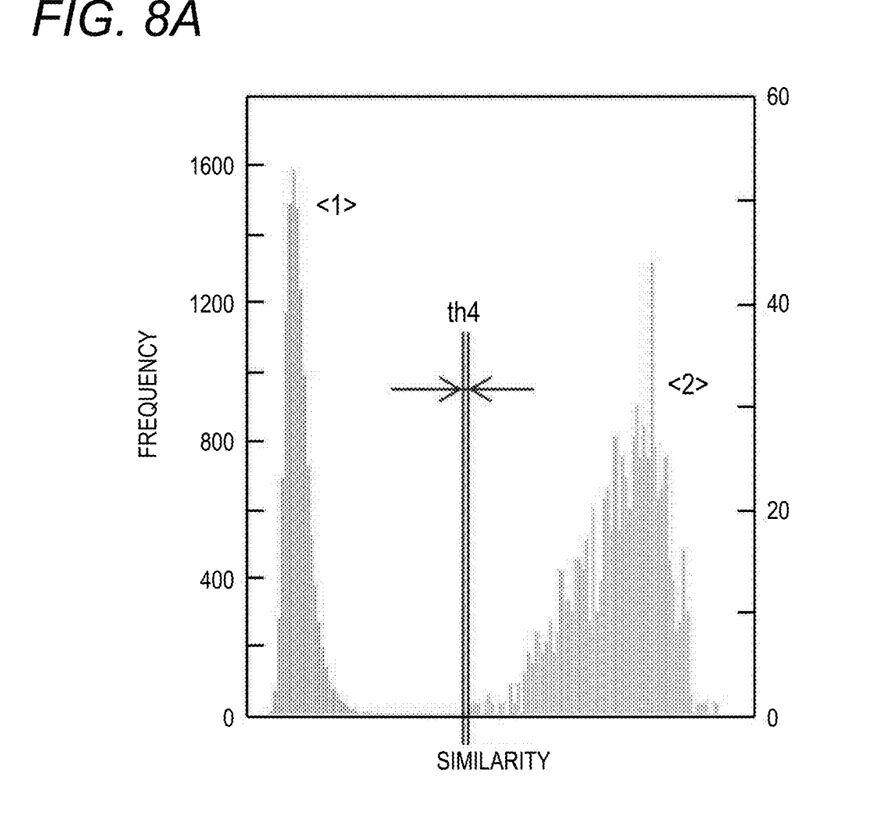
FIG. 8A is a diagram for explaining distinctiveness when an incomplete fixed pattern is used as an amorphous pattern in the identification device according to a second exemplary embodiment.
Figure 8B:
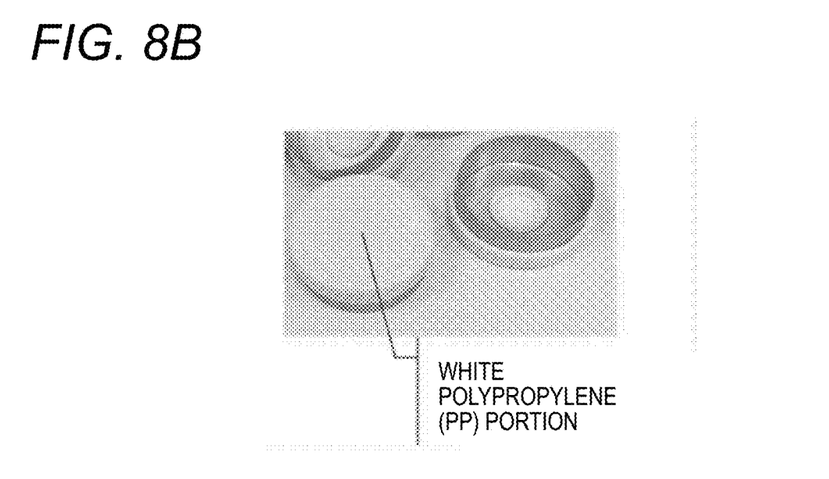
FIG. 8B is a diagram illustrating an example of a cap illustrated in the second exemplary embodiment.

The exemplary embodiment is applied to a cap formed by injection forming using a synthetic resin as illustrated in FIG. 8B as a molded article. In the example of the cap, there is a region where the surface of the mold is not completely transferred to the back side of the cap (hereinafter, sometimes referred to as an "incomplete transfer region"). In the exemplary embodiment, the pattern of the incomplete transfer region is used as the amorphous pattern AP.

The distribution indicated by <1> in FIG. 8A indicates the result of comparison between plural caps illustrated in FIG. 8B, and the distribution indicated by <2> indicates the result of comparison between images of different shots (different molded articles of the same mold) in the same region. As illustrated in <1> of FIG. 8A, the results of comparison with each other in this example are distributed in the vicinity of a relatively lowest similarity. On the other hand, the distribution indicated by <2> has a wider distribution than the distribution indicated by <1>, and the skirt also becomes longer. However, in this example, the determination range th4 for distinguishing the distribution indicated by <1> from the distribution indicated by <2> is set. That is, the individual identification is performed using the determination range th4.

As described above, although the tentative determination range th4 is set in this example, the width of the determination range th4 is narrow, and the possibility of causing an erroneous determination in individual identification cannot be excluded. That is, there is a possibility that the similarity may decrease due to slight damage or dirt, and in this case, the distribution of <1> and the distribution of <2> may be superimposed. Even in such a case, erroneous determination is suppressed by performing the identification process illustrated in FIG. 4. That is, when there are plural molds for forming the cap of the present example, first, the mold specification process is performed by comparing the collation fixed image with the registered fixed image (FIG. 2B), and the molded mold is specified. Next, the image is narrowed down to the registered amorphous image (FIG. 2B) accompanying the specified mold, and the image is compared with the collation amorphous image, and the individual identification process is performed. As a result, since the registered amorphous image to be compared with the collation amorphous image is limited, erroneous determination in individual identification is suppressed.

Third Exemplary Embodiment

An identification device and an identification program according to the present exemplary embodiment will be described with reference to FIGS. 9A and 9B. In the present exemplary embodiment, as a mold, a batch forming mold is used in which plural molded articles are collectively formed in one mold. Therefore, since the identification device itself is the same as that of the above-described exemplary embodiment, a detailed description will be omitted by referring to FIGS. 1, 2, and 4 when necessary.

Figure 9A:
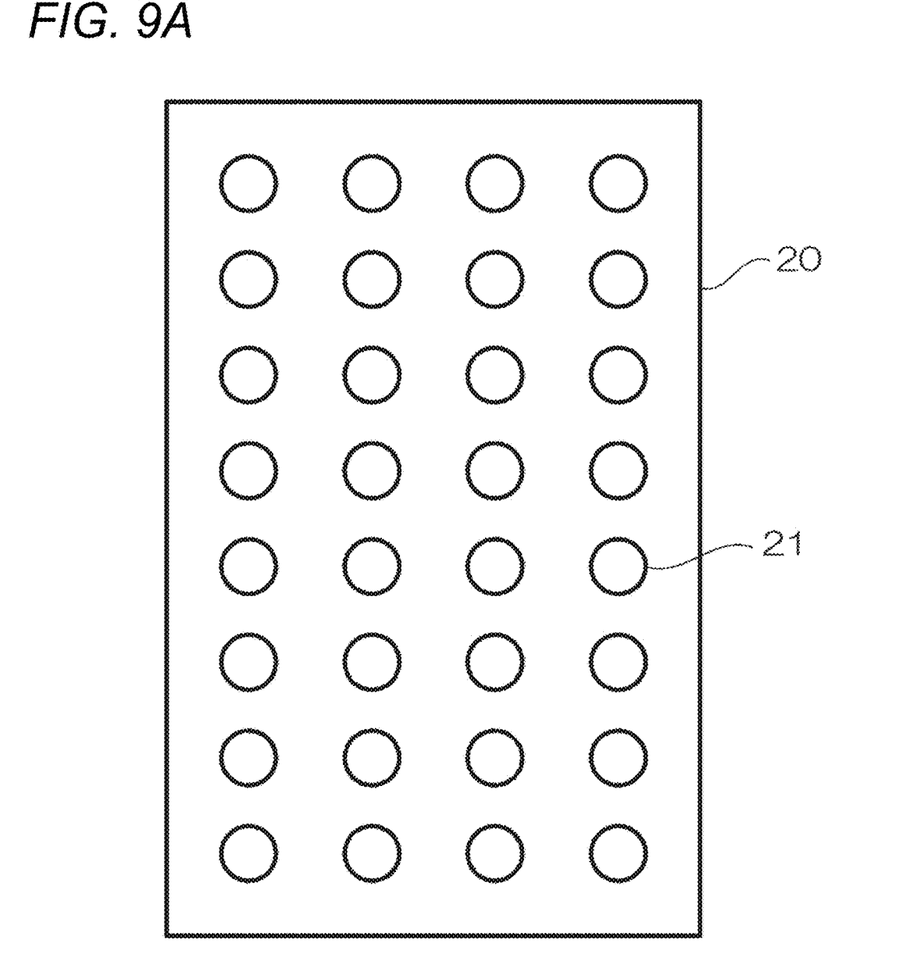
FIG. 9A is a graph illustrating a comparison result for explaining a batch forming mold according to a third embodiment.
Figure 9B:
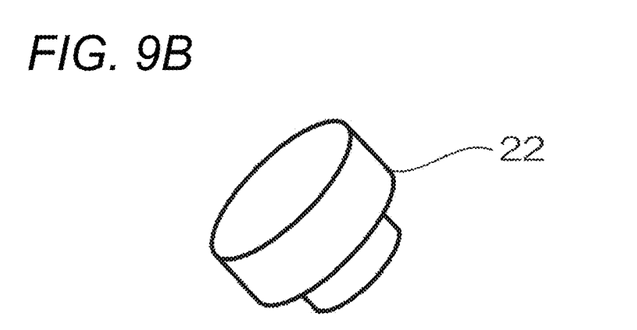
FIG. 9B is a diagram illustrating an example of a lid illustrated in the third exemplary embodiment.

FIG. 9A illustrates an appearance of the batch forming mold 20 for collectively forming the lids 22 illustrated in FIG. 9B. The batch forming mold 20 is, for example, a mold that forms plural lids 22 at a time by injection forming using a synthetic resin. As illustrated in FIG. 9A, the batch forming mold 20 includes plural (32 in the example of FIG. 9A) mold portions 21, and the lid 22 illustrated in FIG. 9B is molded by each mold portion 21. In the present exemplary embodiment, as an example, similar to the second exemplary embodiment, the pattern of the incomplete transfer region is used as an amorphous pattern. Of course, as in the first exemplary embodiment, traces of some auxiliary tool used in forming may be made into an amorphous pattern.

Also in the identification device and the identification program according to the present exemplary embodiment, the identification process illustrated in FIG. 4 is executed. That is, for example, when there is one batch forming mold 20, the mold specification process is performed by comparing the collation fixed image with the registered fixed image. In this case, the mold specification process is a process of specifying one of the 32 mold portions 21. Next, an individual identification process is performed by comparing the registered amorphous image accompanying the specified mold portion 21 with the collation amorphous image. As a result, the calculation load is only ⅟₃₂ as compared with the case of comparison with the registered images accompanying all the mold portions 21. In addition, since the registered amorphous image to be collated is narrowed down, erroneous determination is suppressed for the same reason as in the second exemplary embodiment.

In the exemplary embodiments described above, the term "processor" refers to hardware in a broad sense. Examples of the processor include general processors (for example, CPU: Central Processing Unit) and dedicated processors (for example, GPU: Graphics Processing Unit, ASIC: Application Specific Integrated Circuit, FPGA: Field Programmable Gate Array, and programmable logic device). The operations of the processor in the above exemplary embodiment may be performed not only by one processor but also by cooperation of multiple processors existing at physically separated locations. Further, the order of the operations of the processor is not limited to the order described in the above exemplary embodiments, and may be changed as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCES SIGNS LIST

10 Identification device
11 CPU
12 ROM
13 RAM
15 Input unit
16 UI unit
17 Storage unit
18 Bus
20 Batch forming mold
21 Mold portion
22 Lid
30 Fixed region
31 Amorphous Region
32 Imaging region
FP Fixed pattern
AP Amorphous pattern
th1, th2, th3, th4 Determination range

What is claimed is:

1. An identification device comprising:
a processor,
wherein the processor is configured to:
acquire a collation fixed image that is an image of at least a part of a region, where a fixed pattern is formed, of a collation molded article that is a collation target, and a collation amorphous image that is an image of at least a part of a region, where an amorphous pattern that is a pattern formed when the fixed pattern is formed and formed on a region different from the region where the fixed pattern is formed, of the collation molded article;
refer to a storage unit that stores, as a registered image in advance for each of at least one mold, a pair of a registered fixed image, that is an image of at least a part of a region where a fixed pattern is formed, and a registered amorphous image, that is an image of at least a part of a region where an amorphous pattern is formed, of each of a plurality of molded articles formed by using the at least one mold; and
specify a mold that forms the collation molded article using the registered fixed image and the collation fixed image, and identify whether the collation amorphous image matches the registered amorphous image of any of the registered images corresponding to the specified mold.

2. The identification device according to claim 1, wherein the processor is configured to:
acquire a pair of the collation fixed image and the collation amorphous image which are set as one image; and
refer to the storage unit that stores the registered image that is a pair of the registered fixed image and the registered amorphous image that are set as one image in advance.

3. The identification device according to claim 2, wherein the processor is configured to:
acquire a pair of the collation fixed image and the collation amorphous image captured with an imaging resolution corresponding to a region in which a finer pattern is formed between the region where the fixed pattern is formed and the region where the amorphous pattern is formed; and
refer to a storage unit that stores the registered image captured at the imaging resolution in advance.

4. The identification device according to claim 3, wherein the amorphous pattern is at least one of a trace of a tool that is auxiliarily used in the forming using the mold and a pattern of a region where the fixed pattern is incompletely formed.

5. The identification device according to claim 2, wherein the amorphous pattern is at least one of a trace of a tool that is auxiliarily used in the forming using the mold and a pattern of a region where the fixed pattern is incompletely formed.

6. The identification device according to claim 1, wherein the processor is configured to:
acquire a pair of the collation fixed image and the collation amorphous image that are set as separate images, and
refer to the storage unit that stores the registered image that is a pair of the registered fixed image and the registered amorphous image that are set as separate images in advance.

7. The identification device according to claim 6, wherein the processor is configured to,
acquire a pair of the collation fixed image captured at a resolution corresponding to a region where the fixed pattern is formed and the collation amorphous image captured at a resolution corresponding to a region where the amorphous pattern is formed; and
refer to the storage unit that stores the registered image that is a pair of the registered fixed image captured at a resolution corresponding to a region where the fixed pattern is formed and the registered amorphous images captured at a resolution corresponding to a region where the amorphous pattern is formed in advance.

8. The identification device according to claim 7, wherein the processor is configured to:
acquire a pair of the collation amorphous image and the collation fixed image captured by increasing a second resolution when a region where the amorphous pattern is formed is captured higher than a first resolution when a region where the fixed pattern is formed is captured; and
refer to the storage unit that stores the registered image that is a pair of the registered fixed image captured at the first resolution and the registered amorphous image captured at the second resolution in advance.

9. The identification device according to claim 8, wherein the amorphous pattern is at least one of a trace of a tool that is auxiliarily used in the forming using the mold and a pattern of a region where the fixed pattern is incompletely formed.

10. The identification device according to claim 7, wherein the amorphous pattern is at least one of a trace of a tool that is auxiliarily used in the forming using the mold and a pattern of a region where the fixed pattern is incompletely formed.

11. The identification device according to claim 6, wherein the amorphous pattern is at least one of a trace of a tool that is auxiliarily used in the forming using the mold and a pattern of a region where the fixed pattern is incompletely formed.

12. The identification device according to claim 1, wherein the amorphous pattern is at least one of a trace of a tool that is auxiliarily used in the forming using the mold and a pattern of a region where the fixed pattern is incompletely formed.

13. A non-transitory computer readable medium storing a program causing a computer to execute a process for identification, the process comprising:
- acquiring a collation fixed image that is an image of at least a part of a region, where a fixed pattern is formed, of a collation molded article that is a collation target, and a collation amorphous image that is an image of at least a part of a region, where an amorphous pattern that is a pattern formed when the fixed pattern is formed and formed on a region different from the region where the fixed pattern is formed, of the collation molded;
- referring to a storage unit that stores, as a registered image in advance for each of at least one mold, a pair of a registered fixed image, that is an image of at least a part of a region where a fixed pattern is formed, and a registered amorphous image, that is an image of at least a part of a region where an amorphous pattern is formed, of each of a plurality of molded articles formed by using the at least one mold; and
- specifying a mold that forms the collation molded article using the registered fixed image and the collation fixed image, and identifying whether the collation amorphous image matches the registered amorphous image of any of the registered images corresponding to the specified mold.

14. An identification method comprising:
- acquiring a collation fixed image that is an image of at least a part of a region, where a fixed pattern is formed, of a collation molded article that is a collation target, and a collation amorphous image that is an image of at least a part of a region, where an amorphous pattern that is a pattern formed when the fixed pattern is formed and formed on a region different from the region where the fixed pattern is formed, of the collation molded;
- referring to a storage unit that stores, as a registered image in advance for each of at least one mold, a pair of a registered fixed image, that is an image of at least a part of a region where a fixed pattern is formed, and a registered amorphous image, that is an image of at least a part of a region where an amorphous pattern is formed, of each of a plurality of molded articles formed by using the at least one mold; and
- specifying a mold that forms the collation molded article using the registered fixed image and the collation fixed image, and identifying whether the collation amorphous image matches the registered amorphous image of any of the registered images corresponding to the specified mold.

* * * * *